United States Patent
Trent

(10) Patent No.: US 9,482,379 B2
(45) Date of Patent: Nov. 1, 2016

(54) TWIST-TO-CONNECT DRY BREAK COUPLING

(71) Applicant: Parker-Hannifin Corporation, Cleveland, OH (US)

(72) Inventor: Thomas Clifford Trent, Fort Wayne, IN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/888,586

(22) PCT Filed: May 1, 2013

(86) PCT No.: PCT/US2013/039074
§ 371 (c)(1),
(2) Date: Nov. 2, 2015

(87) PCT Pub. No.: WO2014/178861
PCT Pub. Date: Nov. 6, 2014

(65) Prior Publication Data
US 2016/0138746 A1    May 19, 2016

(51) Int. Cl.
| | |
|---|---|
| *F16L 37/40* | (2006.01) |
| *F16L 37/23* | (2006.01) |
| *F16L 37/34* | (2006.01) |
| *F16L 29/02* | (2006.01) |
| *F16L 37/12* | (2006.01) |

(52) U.S. Cl.
CPC ............... *F16L 37/40* (2013.01); *F16L 29/02* (2013.01); *F16L 37/12* (2013.01); *F16L 37/23* (2013.01); *F16L 37/34* (2013.01)

(58) Field of Classification Search
CPC ......... F16L 37/30; F16L 37/32; F16L 37/34; F16L 37/38; F16L 37/40; F16L 37/42; F16L 29/02; F16L 37/23; F16L 37/12

USPC .................................. 137/614.03–614.06
See application file for complete search history.

(56) References Cited

U.S. PATENT DOCUMENTS

| | | |
|---|---|---|
| 5,123,446 A | 6/1992 | Haunhorst et al. |
| 5,592,970 A | 1/1997 | Stucchi et al. |
| 5,806,564 A | 9/1998 | Wilcox |
| 7,401,626 B1 | 7/2008 | Plattner |
| 7,762,279 B2 * | 7/2010 | Zeiber et al. ........... F16L 29/04 137/614.03 |

OTHER PUBLICATIONS

International Search Report and Written Opinion for corresponding patent application No. PCT/US2013/039074 dated Jan. 20, 2014.

* cited by examiner

*Primary Examiner* — Kevin Lee
(74) *Attorney, Agent, or Firm* — Renner, Otto, Boisselle & Sklar, LLP

(57) ABSTRACT

A coupling including female and male couplers configured to be coupled by first and second stage connections. In the first stage connection, a plurality of detents in the female coupler are urged into a detent recess in the male coupler to coupled the female and male couplers. To make the second stage connection after the first stage connection has been made, threads on the male coupler are mated with threads on a release sleeve, which causes valves disposed in the female and male couplers to move to an open position to allow fluid flow through the coupling. In this way, reduced force is employed to engage the female and male couplers while avoiding contact between the detents and the threads on the male coupler, thereby preventing the detents and threads on the male coupler from damaging one another.

34 Claims, 7 Drawing Sheets

TWIST-TO-CONNECT DRY BREAK COUPLING

This application is a national phase of International Application No. PCT/US2013/039074 filed May 1, 2013 and published in the English language.

FIELD OF INVENTION

The present invention relates generally to couplings, and more particularly to dry break quick connect/disconnect couplings for use with electronic devices.

BACKGROUND

Electronic devices, such as computer servers, generate heat during operation, and therefore a cooling system is used to cool the electronic devices. For example, air may be blown over the electronic devices or a water-based fluid may be circulated through a heat exchanger coupled to the electronic devices to cool the devices.

In a data center that houses racks of servers, the amount of air or water-based fluid required for heating may vary from rack to rack. The varied heat may arise from some racks having a greater density of electronic equipment or electric equipment operating at higher levels.

SUMMARY OF INVENTION

The present invention provides a coupling including female and male couplers configured to be coupled by first and second stage connections. In the first stage connection, a plurality of detents in the female coupler are urged into a detent recess in the male coupler to couple the female and male couplers. To make the second stage connection after the first stage connection has been made, threads on the male coupler are mated with threads on a release sleeve of the female coupler, which causes valves disposed in the female and male couplers to move to an open position to allow fluid flow through the coupling. In this way, reduced force is employed to engage the female and male couplers while avoiding contact between the detents and the threads on the male coupler, thereby preventing the detents and threads on the male coupler from damaging one another.

According to one aspect of the invention, a coupling is provided including female and male couplers configured to be coupled together. The female coupler includes a valve body having axially inner and axially outer ends, an axially extending cavity for receiving the male coupler at the inner end, and a plurality of circumferentially spaced openings extending through a wall of the valve body near the inner end, a release sleeve surrounding the valve body at the circumferentially spaced openings and being movable between first and second positions relative to the valve body, the release sleeve having threads for mating with threads on the male coupler, a plurality of detents respectively received in the plurality of circumferentially spaced openings, each detent being urged radially inwardly by the release sleeve when the release sleeve is in the first position and being movable radially outwardly when the release sleeve is in the second position, and a valve disposed in the axially extending cavity, the valve being openable and closable to allow/prevent fluid flow through the cavity. The male coupler includes a valve body having an axially inner end configured to be received in a cavity of the female coupler and an axially outer end, an axially extending cavity, a detent recess on an outer surface of the valve body near the axially inner end into which the detents of the female coupler are urged radially inwardly into to couple the female and male couplers, and threads between the detent recess and the axially outer end for mating with threads on of the female coupler, and a valve disposed in the axially extending cavity, the valve being openable and closable to allow/prevent fluid flow through the cavity.

The release sleeve has axially inner and axially outer ends, and wherein the axially inner end has the threads on an inner circumferential surface.

The release sleeve has a radially inwardly projecting ledge that urges the detents radially inwardly in the first position.

The female coupler further includes a resilient member that biases the release sleeve in the first position.

The axially outer end of the release sleeve is retained on the valve body of the female coupler by a retainer.

The retainer is a high lubricity polytetrafluoroethylene retaining ring.

The axially extending cavity in the valve body of the female coupler defines a first cavity portion for receiving the male coupler at the axially inner end of the valve body and a second cavity portion for receiving an adapter at the axially outer end of the valve body.

The female coupler further includes an adapter received in the axially extending cavity at the axially outer end of the valve body, the adapter configured to be coupled to a tube.

The adapter includes threads on an outer surface that mate with threads on an inner circumferential surface of the valve body at the outer end The valve body of the female coupler includes a radially inwardly projecting valve seat, and wherein the poppet stem is seated against the valve seat in the first position to prevent fluid flow through the cavity, and movable away from the valve seat to a second position to allow fluid flow through the cavity.

The valve of the female coupler includes a poppet stem and a resilient member biasing the poppet stem in a first position preventing fluid from flowing through the cavity.

The poppet stem has a radially outwardly extending portion that serves as a seat for an inner end of the resilient member.

The valve of the female coupler further includes a guide spider surrounding the poppet stem, wherein the guide spider serves as a seat for an outer end of the resilient member.

The guide spider includes a hub and a plurality of circumferentially spaced legs extending radially outwardly from the hub, wherein fluid flowing through the cavity flows around the legs.

An end face of the adapter abuts the plurality of legs to retain the valve assembly within the valve body of the female coupler.

The threads on the valve body of the male coupler are on the outer surface of the valve body between the detent recess and the axially outer end.

The detent recess is an annular channel.

The annular channel has an axial length at least three times as great as its radial depth.

The annular channel has an axial length at least twice as great as a diameter of the detents.

The male coupler further includes an adapter received in the axially extending cavity at the axially outer end of the valve body, the adapter configured to be coupled to a tube.

The adapter includes threads on an outer surface that mate with threads on an inner circumferential surface of the valve body at the outer end.

The valve of the male coupler includes a poppet stem, a sleeve surrounding the poppet stem, and a resilient member biasing the sleeve in a first position preventing fluid from flowing through the cavity.

A head portion of the poppet stem is seated against the sleeve in the first position to prevent fluid flow through the cavity, and the sleeve is movable away from the head portion to a second position to allow fluid flow through the cavity.

An end face of the sleeve serves as a seat for an inner end of the resilient member.

The valve assembly of the male coupler further includes a guide spider surrounding the poppet stem, wherein the guide spider serves as a seat for an outer end of the resilient member.

The guide spider includes a hub and a plurality of circumferentially spaced legs extending radially outwardly from the hub, wherein fluid flowing through the cavity flows around the legs.

An end face of the adapter abuts the plurality of legs to retain the valve assembly within the valve body of the male coupler.

When the release sleeve is in the second position, the male coupler is inserted into the axially extending cavity in the valve body of the female coupler, thereby urging the plurality of detents radially outwardly until the detent recess is aligned with the detents.

When the detent recess is aligned with the detents, the release sleeve is moved to the first position to urge the detents radially inwardly into the detent recess to couple the female and male couplers.

When the detents are urged into the detent recess, the valves are closed.

As the threads on the outer surface of the valve body of the male coupler are being mated with the threads on the inner circumferential surface of the release sleeve, end faces of the poppet stems come into contact with one another.

As the threads are mated, the sleeve of the male coupler comes into contact with a radially inwardly projecting portion of the valve body of the female coupler and the sleeve is moved to the second position.

As the threads are mated, the poppet stem of the male coupler is advanced into the cavity of the female coupler, thereby unseating the poppet stem of the female coupler from its valve seat.

The foregoing and other features of the invention are hereinafter described in greater detail with reference to the accompanying drawings.

DETAILED DESCRIPTION

The principles of the present application have particular application to dry break, quick connect/disconnect couplings for connecting a source of fluid, such as a two-phase refrigerant, to a heat-generating component, such as a rack of servers in a data center to cool the rack of serves, and thus will be described below chiefly in this context. It will of course be appreciated, and also understood, that the principles of the invention may be useful in other fluid coupling applications where it is desirable to make a connection without the use of tools.

Figure 1:
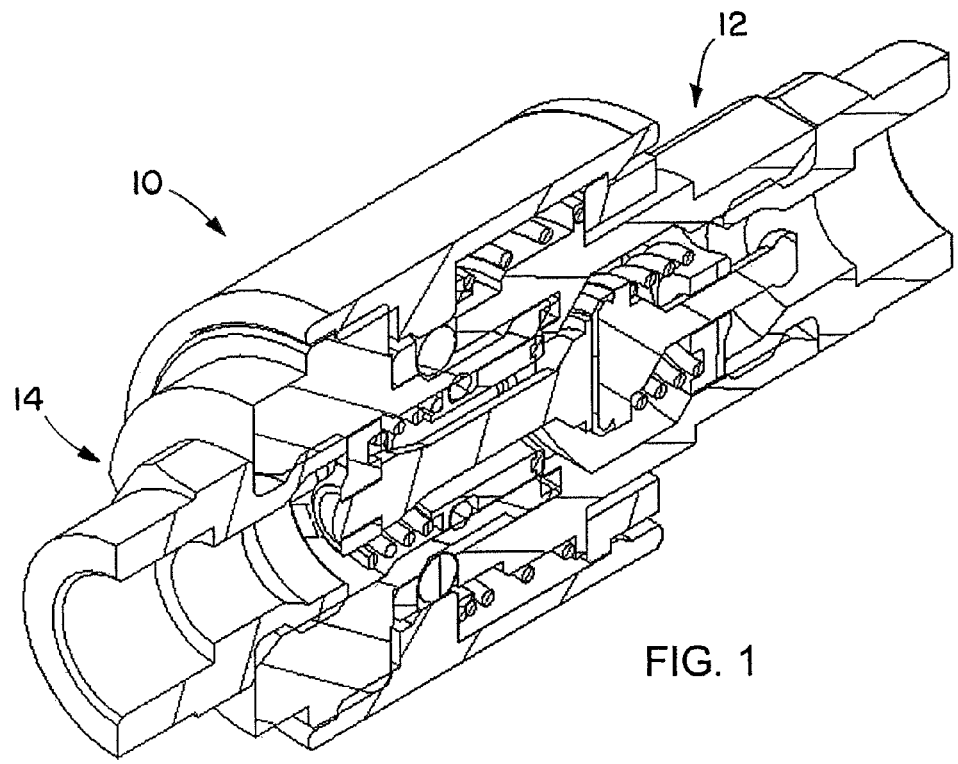
FIG. 1 is a perspective cross-sectional view of an exemplary coupling including female and male couplers coupled together according to the invention.
Figure 3:
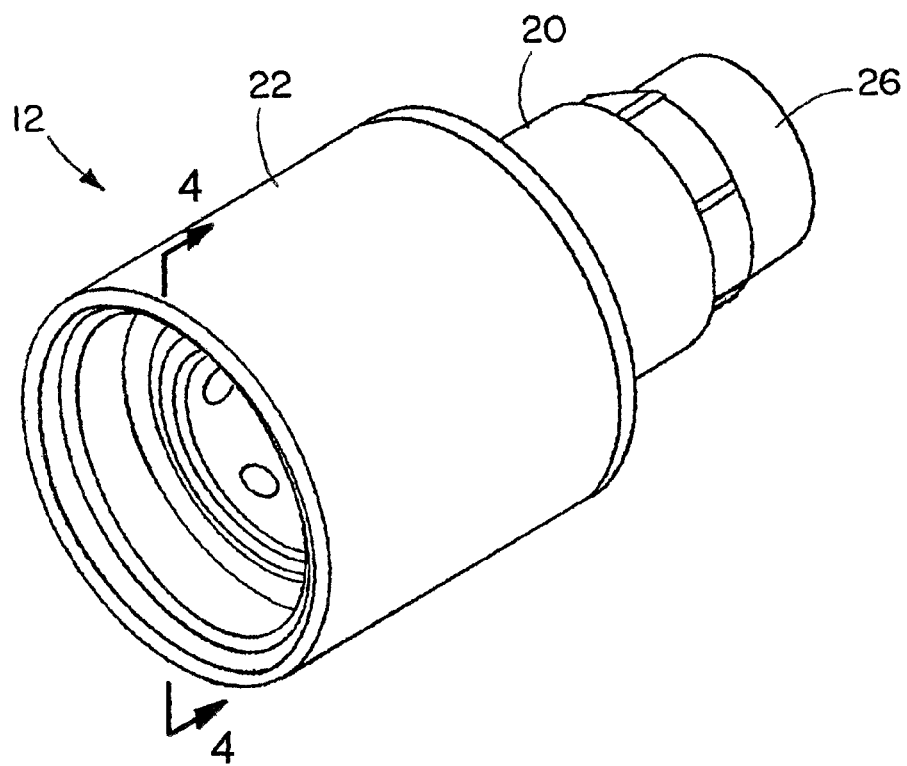
FIG. 3 is a perspective view of the exemplar female coupler.
Figure 4:
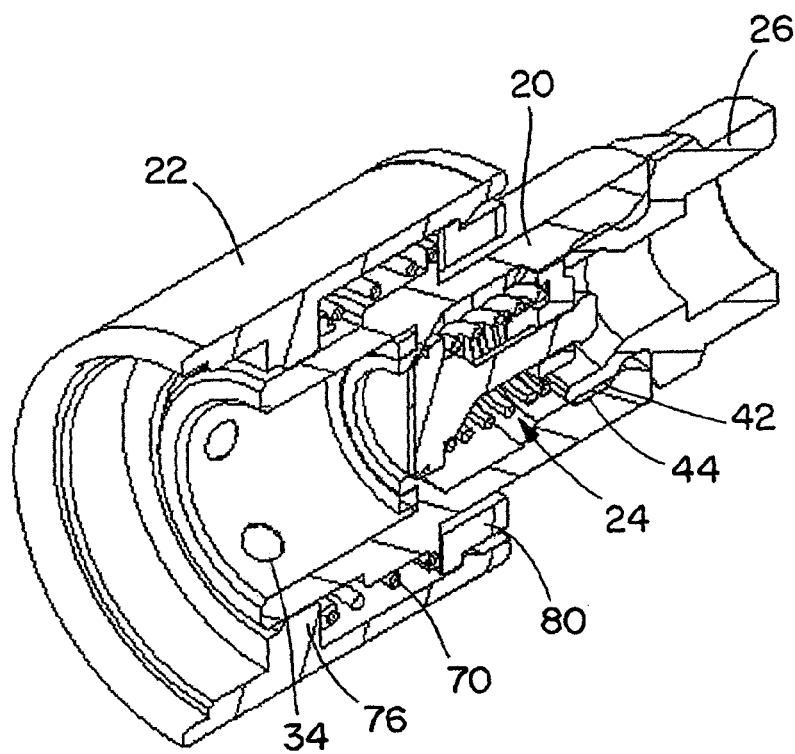
FIG. 4 is a cross-sectional view of the exemplary coupler taken about line 4-4 in FIG. 3.
Figure 5:
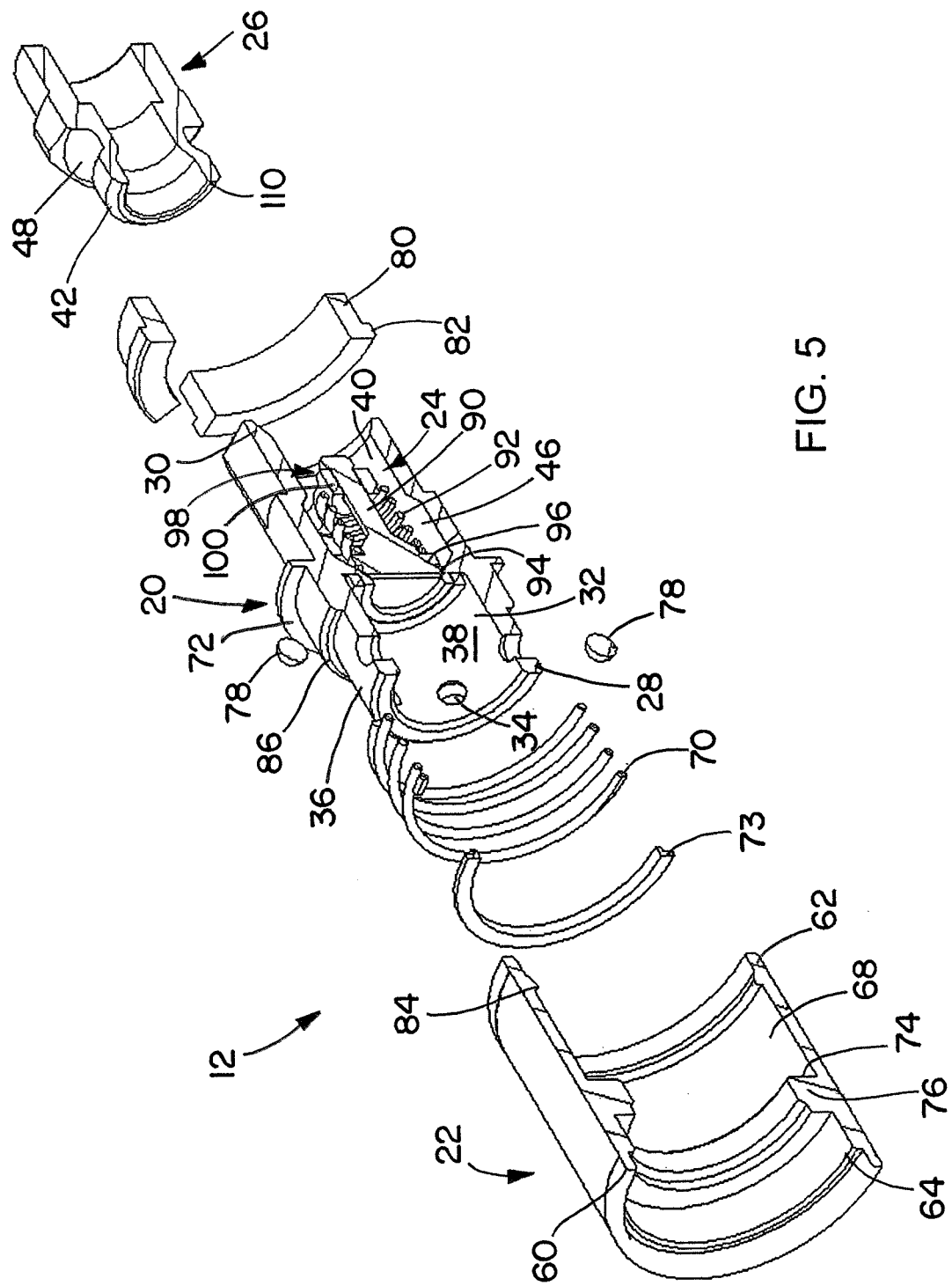
FIG. 5 is an exploded cross-sectional view of the exemplary female coupler.

Turning now to FIG. 1, an exemplary quick connect/disconnect coupling is illustrated generally at reference numeral 10. The coupling 10 includes a female coupler 12 and a male coupler 14. The female and male couplers 12 and 14 may be coupled by a two stage connection, as discussed below in detail, where a safety lock is first engaged and then the female and male couplers 12 and 14 are further coupled by a threaded connection to provide a compact dry break quick connect/disconnect coupling having a reduced insertion force for use in fluid systems when the coupling 10 is under pressure. The couplers 12 and 14 may be connected to provide a two-phase fluid, such as two-phase refrigerant, to cool components in a data center Referring now to FIGS. 3-5, the female coupler 12 includes a valve body 20, a release sleeve 22, a valve assembly 24, and an adapter 26. The valve body 20 has axially inner and axially outer ends 28 and 30, an axially extending cavity 32 for receiving the male coupler 14 at the axially inner end 28, and a plurality of circumferentially spaced openings 34 extending through a wall 36 of the valve body 20 near the inner end 28. The axially extending cavity 32 defines a first cavity portion 38 for receiving the male coupler 14 at the axially inner end 28 and a second cavity portion 40 for receiving the adapter 26 at the axially outer end 30. The adapter 26, which may be coupled to a suitable tube in any suitable manner, is coupled to the valve body 20 in any suitable manner, such as by threads 42 on an outer surface of the adapter 26 that mate with threads 44 on an inner circumferential surface 46 of the valve body 20 at the outer end 30. The adapter 26 includes a groove 48 for a suitable seal, such as an o-ring, to seal the adapter 26 to the valve body 20.

Referring now to the release sleeve 22 in detail, the release sleeve 22 surrounds the valve body 20 at the circumferentially spaced openings 34. The release sleeve 22 has axially inner and outer ends 60 and 62 and includes threads 64 for mating with threads 66 (FIG. 2) on the male coupler 14, which threads 64 and 66 make the second stage connection. As shown, the threads 64 are provided on an inner circumferential surface 68 of the release sleeve 22 at the axially inner end 60.

The release sleeve 22 is movable between first and second positions relative to the valve body 20. The release sleeve is biased in the first position shown in FIG. 9 by a resilient member 70, such as a spring, which is seated by spring seat 72 extending outward from the valve body 20 and a spring seat formed on a sleeve 73. The sleeve 73 abuts a backside 74 of a ledge 76 projecting radially inwardly from the inner circumferential surface 68 of the release sleeve 22, and may be formed of any suitable material, such as a high strength, low friction material.

The release sleeve 22 is retained on the valve body 20 at the axially outer end 62 by a retainer 80, such as a c-shaped retainer ring. The retainer 80 may be formed of a high strength, low friction material, such as a high lubricity material, such as a high lubricity polytetrafluoroethylene retaining ring. The retainer 80 includes a radially outwardly projecting portion 82 that engages a radially inwardly projecting portion 84 on the inner circumferential surface 68 of the release sleeve 22 at the axially outer end 62 when the retainer is snapped in place. When the release sleeve 22 is in the first position, the retainer 80 abuts a backside of the spring seat 72 on the valve body 20, thereby preventing the release sleeve 22 from advancing further towards the axially inner end 28 of the valve body 20. When the release sleeve 22 is in the second position, the spring seat 73 abuts a ledge 86 on the valve body 20 to prevent the release sleeve 22 from advancing further towards the axially outer end 30 of the valve body 20.

The female coupler 12 additionally includes a plurality of detents 78, such as detent balls respectively received in the plurality of circumferentially spaced openings 34. When the release sleeve 22 is in the first position, the radially inwardly projecting ledge 76 urges the plurality of detents 78 radially inwardly. The release sleeve 22 is in the first position when the female and male couplers 12 and 14 are disconnected and after the second stage connection has been made.

When the release sleeve 22 is in the second position, the ledge 76 is moved axially away from the openings 34, allowing the plurality of detents 78 to be moved radially outwardly, thereby allowing the male coupler 14 to be inserted into the axially extending cavity 32. The release sleeve 22 can then be moved back to the first position to engage the detents 78 with the male coupler 14 to make the first stage connection.

Figure 9:
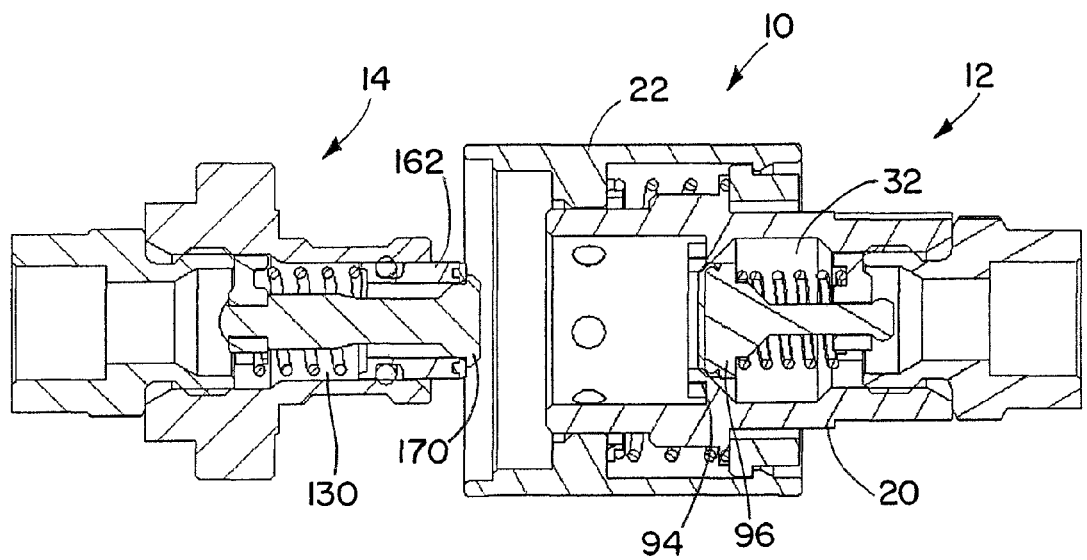
FIG. 9 is a cross-sectional view of the exemplary female and male couplers uncoupled.

Referring now to the valve assembly 24 in detail, the valve assembly 24 is disposed in the axially extending cavity 32 and includes a poppet stem 90 and a resilient member 92, such as a spring, biasing the poppet stem 90 in a first position shown in FIG. 9. When the poppet stem 90 is in the first position, the spring 92 biases the poppet stem 90 against a valve seat 94 projecting radially inwardly from the valve body 20, thereby preventing fluid from flowing through the cavity 32. The valve seat 94 may be any suitable material, such as a bonded elastomeric material, such as neoprene. As shown, the poppet stem 90 includes a radially outwardly extending portion 96, herein referred to as a poppet head, which is seated against the valve seat 94, and which may have a crown having a suitable material, such as rubber. The poppet stem 90 is in the first position when the female and male couplers 12 and 14 are disconnected and during the first stage connection. When the poppet stem 90 is in a second position shown in FIG. 2, the poppet stem 90 is moved away from the valve seat 94 to allow fluid flow through the cavity 32. The poppet stem 90 is in the second position after the second stage connection has been made.

Figure 2:
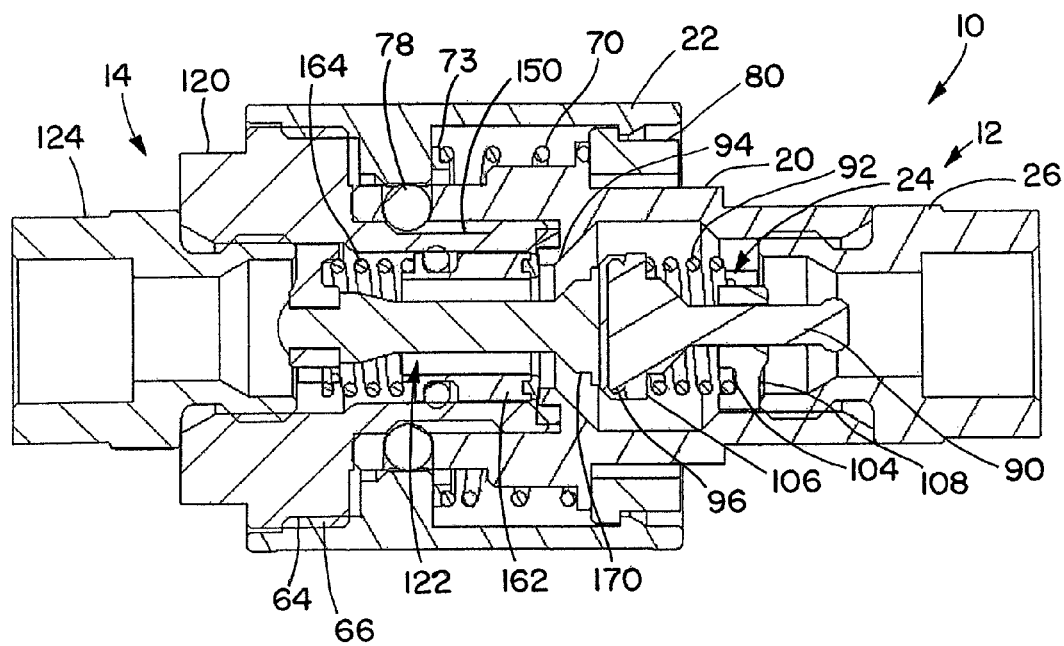
FIG. 2 is a cross-sectional view of the exemplary female and male couplers coupled together.

The valve assembly 24 also includes a guide spider 98 surrounding the poppet stem 90, where the poppet stem 90 is movable relative to the guide spider 98. The guide spider includes a hub 100 and a plurality of circumferentially spaced legs 102 extending radially outwardly from the hub 100. As fluid flows through the cavity 32 (when the poppet stem 90 is in the second position), the fluid flows between the plurality of circumferentially spaced legs 102. As shown in FIG. 2, a front side 104 of the plurality of circumferentially spaced legs 102 facing the poppet head 96 serve as a seat for an outer end of the resilient member 92, and a backside 106 of the poppet head 96 serves as a seat for an inner end of the resilient member 92. A backside 108 of the plurality of circumferentially spaced legs 102 facing the adapter 26 abuts an end face 110 of the adapter 26 when the adapter 26 is coupled to the valve body 20 to retain the valve assembly 24 within the valve body 20.

Figure 6:
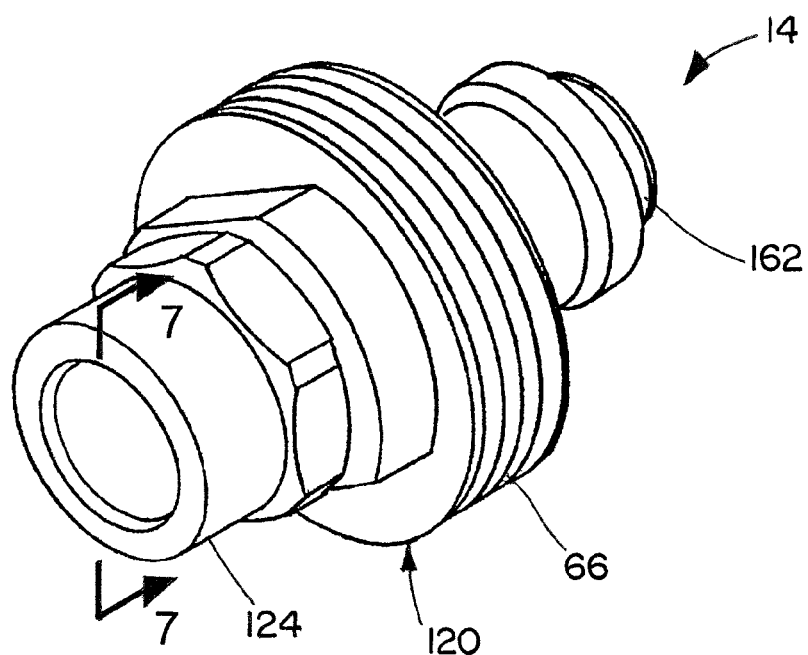
FIG. 6 is a perspective view of the exemplary male coupler.
Figure 7:
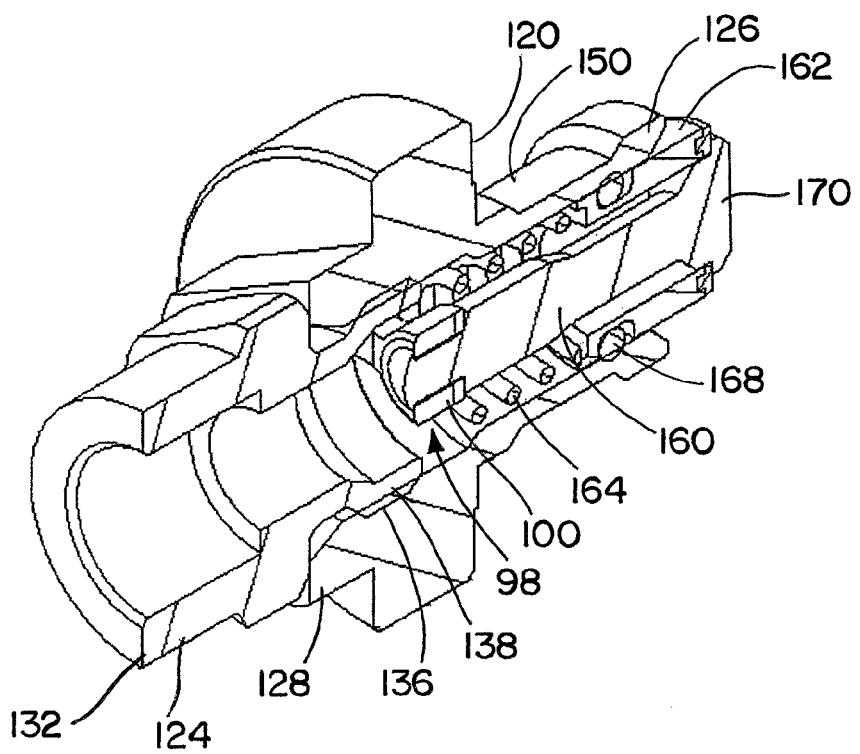
FIG. 7 is a cross-sectional view of the exemplary male coupler taken about line 7-7 in FIG. 6.
Figure 8:
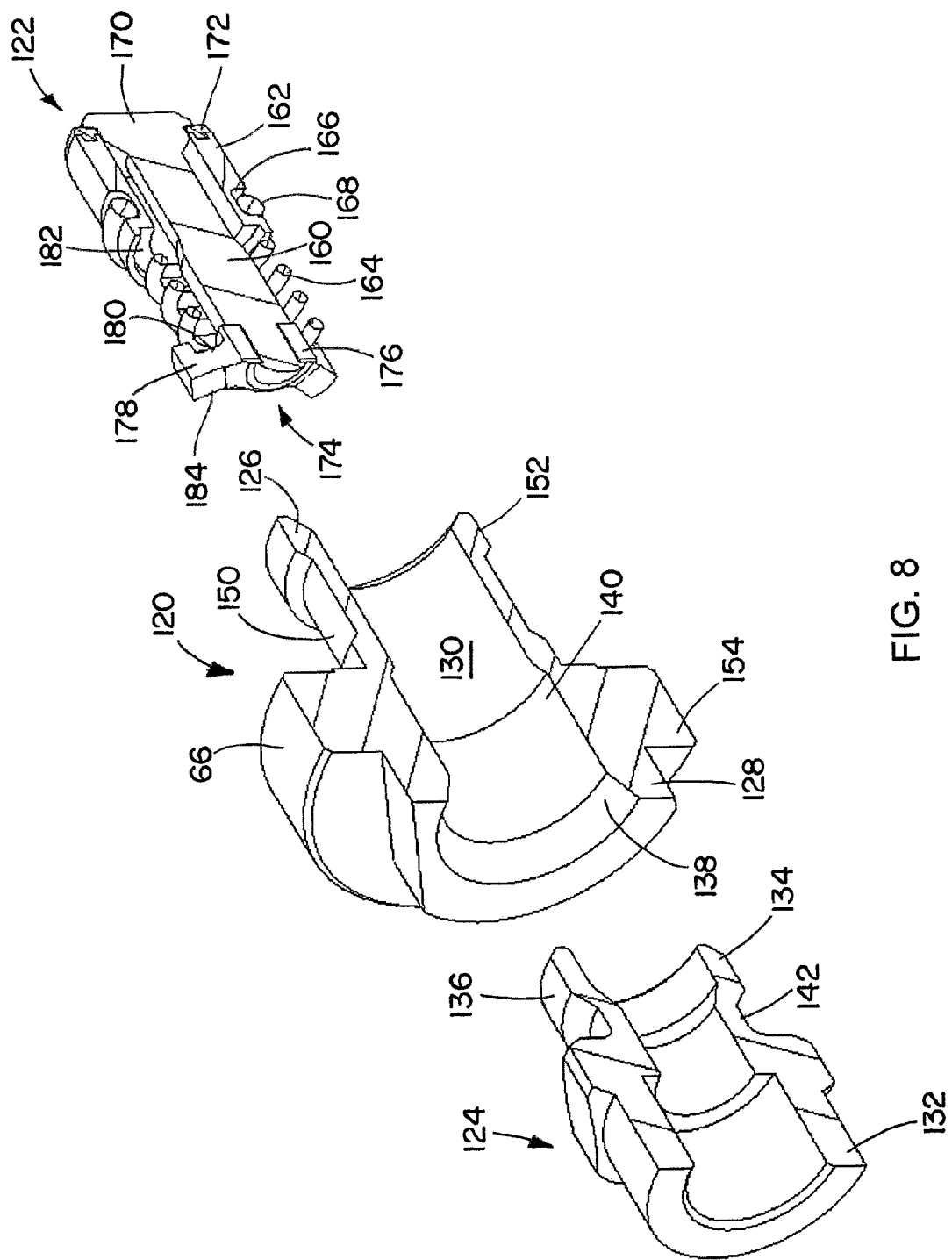
FIG. 8 is an exploded cross-sectional view of the exemplary male coupler.

Referring now to FIGS. 6-8, the male coupler 14 includes a valve body 120, a valve assembly 122, and an adapter 124. The valve body 120 has an axially inner end 126 configured to be received in the cavity 32 of the female coupler 12, an axially outer end 128, and an axially extending cavity 130 for receiving the valve assembly 122 and the adapter 124. The adapter 124, which may be coupled to a suitable tube in any suitable manner at an outer end 132 of the adapter, is coupled to the valve body 120 at an inner end 134 of the adapter in any suitable manner, such as by threads 136 on an outer surface of the adapter 124 at the inner end 134 that mate with threads 138 on an inner circumferential surface 140 of the valve body 120 at the outer end 128. The adapter 124 includes a groove 142 for a suitable seal, such as an o-ring, to seal the adapter 124 to the valve body 120.

The valve body 120 also includes a detent recess 150, such as an annular channel, on an outer surface 152 of the valve body 120 near the axially inner end 126. The detents 78 of the female coupler 12 are urged radially inwardly into the detent recess 150 to couple the female and male couplers 12 and 14. The detent recess 150 is axially elongated such that an axial length of the detent recess 150 is at least three times as great as a radial depth of the detent recess 150. Additionally or alternatively, the axial length of the detent recess may be sized such that the axial length is at least twice as great as a diameter of the detents 78. In this way, the detents 78 can be moved from one position in the detent recess 150 to another position in the detent recess 150 as will be described in detail below.

The valve body 120 further includes threads 66 between the detent recess 150 and the axially outer end 128 for mating with the threads 64 on the release sleeve 22. As shown, the threads 66 are provided on the outer surface 152 of the valve body 120 on a radially outwardly projecting portion 154 for mating with the threads 64 on the inner circumferential surface 68 of the release sleeve 22.

Referring now to the valve assembly 122 in detail, the valve assembly 122 is disposed in the axially extending cavity 130 and includes a poppet stem 160, a sleeve 162 surrounding the poppet stem, and a resilient member 164, such as a spring, biasing the sleeve 162 in a first position shown in FIG. 9. Disposed in a seal groove 166 in the sleeve 162 is a suitable seal, such as o-ring 168, that seals the sleeve 162 to the inner circumferential surface 140 of the valve body 120.

When the sleeve 162 is in the first position, a radially outwardly projecting portion 170, herein referred to as a poppet head, is seated against an end face of the sleeve 162 and sealed to the sleeve 162 by a suitable seal 172, such as a bonded elastomeric material or o-ring, such as neoprene. The poppet head may have a crown having a suitable material, such as rubber. The poppet head 170 is seated against the seal 172 to prevent fluid flow through the cavity 130 when the sleeve 162 is in the first position. When the sleeve 162 is moved to a second position shown in FIG. 2 away from the poppet head 170, fluid flows through the cavity 132 around the poppet stem 160 and in-between the poppet stem 160 and the sleeve 162. The sleeve 162 is in the first position when the female and male couplers 12 and 14 are disconnected and during the first stage connection. The sleeve 162 is in the second position after the second stage connection has been made.

The valve assembly 122 also includes a guide spider 174 surrounding the poppet stem 160 opposite the poppet head 170. The guide spider 174 is coupled to the poppet stem 160 in any suitable manner and includes a hub 176 and a plurality of circumferentially spaced legs 178 extending radially outwardly from the hub 176. As fluid flows through the cavity 130 (when the sleeve 162 is in the second position), the fluid flows between the plurality of circumferentially spaced legs 178. A front side 180 of the plurality of circumferentially spaced legs 178 facing the poppet head 170 serves as a seat for an outer end of the resilient member 164, and a backside 182 of the sleeve 162 serves as a seat for an inner end of the resilient member 164. A backside 184 of the plurality of circumferentially spaced legs 178 facing the adapter 124 abuts an end face of the adapter 124 when the adapter 124 is coupled to the valve body 120 to retain the valve assembly 122 within the valve body 120, and the legs 178 abut a reduced diameter portion 186 of the valve body 120 to prevent the legs 178 and stem 160 from moving towards the sleeve 162.

Figure 10:
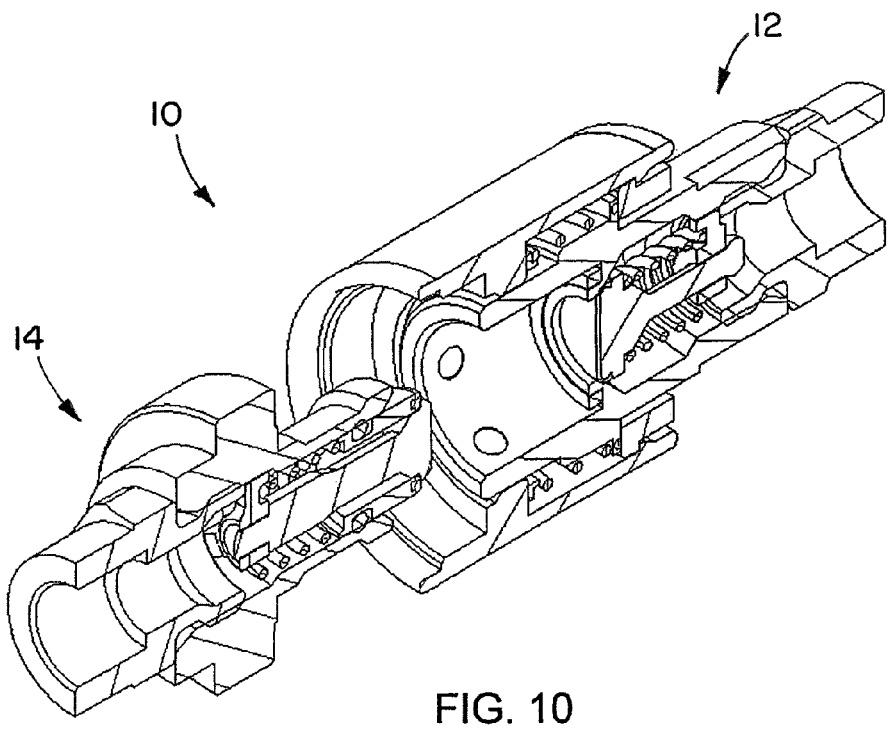
FIG. 10 is a perspective cross-sectional view of the exemplary female and male couplers uncoupled.

Turning now to FIGS. 9 and 10, the female and male couplers 12 and 14 are shown disconnected from one another. When disconnected, the poppet head 96 of the female coupler 12 is seated against the valve seat 94 to prevent fluid from flowing through the cavity 32 to/from the tube coupled to the adapter 26, and the release sleeve 22 is in the first position urging the detents 78 radially inwardly. Similarly, when disconnected, the poppet head 170 is seated against the sleeve 162 to prevent fluid from flowing through the cavity 130 to/from the tube coupled to the adapter 124.

Figure 11:
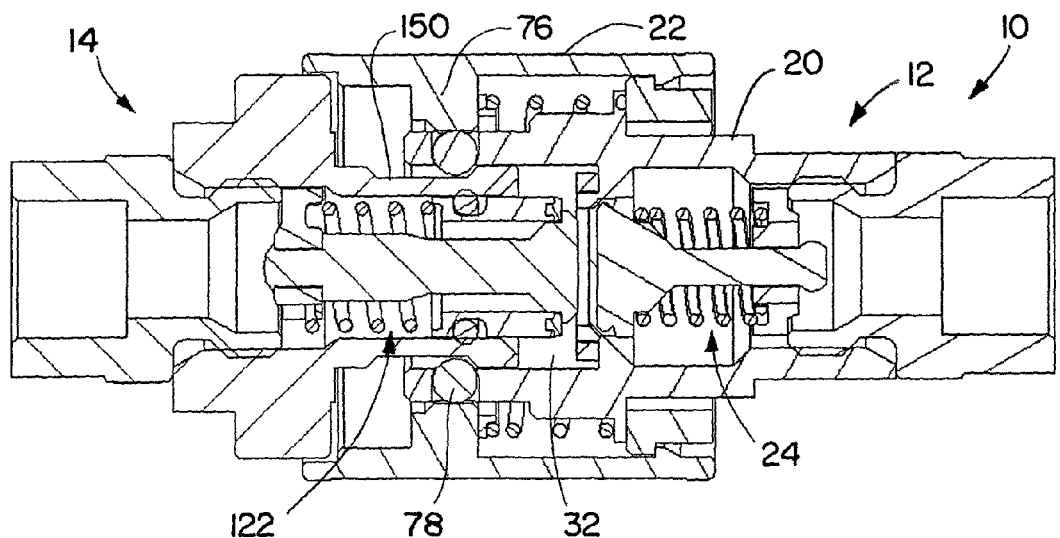
FIG. 11 is a cross-sectional view of the exemplary female and male couplers coupled together.
Figure 12:
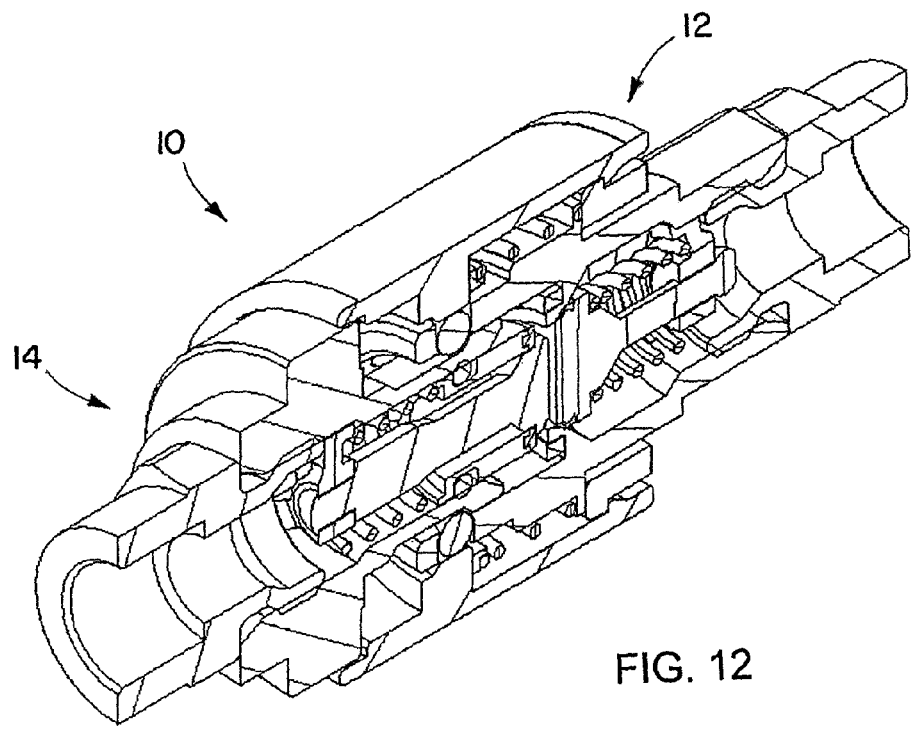
FIG. 12 is a perspective cross-sectional view of the exemplary female and male couplers coupled together.

Turning now to FIGS. 11 and 12, the female and male couplers 12 and 14 are shown in the first stage connection. To make the connection, the release sleeve 22 is moved to the second position and the male coupler 14 is inserted into the axially extending cavity 32 in the valve body 20, thereby urging the plurality of detents 78 radially outwardly until the detent recess 150 is aligned with the detent 78. When the detent recess 150 is aligned with the detents 78, the release sleeve 22 is moved to the first position to urge the detents 78 radially inwardly into the detent recess 150 to couple the female and male couplers 12 and 14. The ledge 76 prevents the detents 78 from being moved out of the recess 150. After the detents 78 have been urged into the detent recess 150, and before the second stage connection, the valve assemblies 24 and 122 remain closed.

Turning again to FIGS. 1 and 2, the female and male couplers 12 and 14 are shown in the second stage connection. To make the connection, the male coupler 14 is advanced further into the cavity 32 mating the threads 66 on the valve body 120 with the threads 64 on the release sleeve. As the threads are mated, end faces of the poppet heads 96 and 170 come into contact with one another and the poppet head 170 moves the poppet head 96 off of the valve seat 94. Specifically, the sleeve 162 comes into contact with a backside of the valve seat 94 and is moved to the second position, thereby compressing the resilient member 164. As this occurs, the poppet head 170 is moved further into the cavity 32 and axially moves the poppet stem 90 towards the adapter 26, thereby compressing the resilient member 92. As the couplers 12 and 14 are mated via the threads 64 and 66, the detents 78 are moved axially from a first position in the detent recess 150 shown in FIG. 11 to a second position in the detent recess 150 shown in FIG. 2.

Once the second stage connection has been made, fluid can flow from the tube connected to the adapter 124, through the adapter 124, between the legs 178 and then between the sleeve 162 and the poppet stem 160. The fluid then flows through the cavity 32 around the poppet stem 90 (between the poppet stem 90 and the inner circumferential surface 46 of the valve body 20), into the adapter 26 and then to the tube connected to the adapter 26. Alternatively, fluid can flow from the tube connected to the adapter 26 to the tube connected to the adapter 124.

In this way, reduced force is used to engage the female and male couplings 12 and 14, the coupling 10 has a reduced length, and reduced torsional friction without using ball bearings. Additionally, the coupling 10 avoids contact between the detents 78 and the threads 66 on the male coupler 14, thereby preventing the detents 78 and threads 66 from damaging one another. Moreover, by providing a two stage connection, the connection in the first stage can serve as a safety lock, thereby providing an active safety lock during connection and disconnection of the second stage.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A coupler including female and male couplers configured to be coupled together,
the female coupler including:
a valve body having axially inner and axially outer ends, an axially extending cavity for receiving the male coupler at the inner end, and a plurality of circumferentially spaced openings extending through a wall of the valve body proximate the inner end;
a release sleeve surrounding the valve body at the circumferentially spaced openings and being movable between first and second positions relative to the valve body, the release sleeve having threads for mating with threads on the male coupler;
a plurality of detents respectively received in the plurality of circumferentially spaced openings, each detent being urged radially inwardly by the release sleeve when the release sleeve is in the first position and being movable radially outwardly when the release sleeve is in the second position; and
a valve disposed in the axially extending cavity, the valve being openable and closable to allow/prevent fluid flow through the cavity; and the male coupler including:
a valve body having:
an axially inner end configured to be received in a cavity of the
an axially extending cavity;
a detent recess on an outer surface of the valve body proximate the axially inner end into which the detents of the female coupler are urged radially inwardly into to couple the female and male couplers; and
threads between the detent recess and the axially outer end for mating with threads on of the female coupler; and
a valve disposed in the axially extending cavity, the valve being openable and closable to allow/prevent fluid flow through the cavity.

2. The coupler according to claim 1, wherein the threads on the valve body of the male coupler are on the outer surface of the valve body between the detent recess and the axially outer end.

3. The coupler according to claim 1, wherein the detent recess is an annular channel.

4. The coupler according to claim 3, wherein the annular channel has an axial length at least three times as great as its radial depth.

5. The coupler according to claim 3, wherein the annular channel has an axial length at least twice as great as a diameter of the detents.

6. The coupler according to claim 1, wherein the male coupler further includes an adapter received in the axially extending cavity at the axially outer end of the valve body, the adapter configured to be coupled to a tube.

7. The coupler according to claim 6, wherein the adapter includes threads on an outer surface that mate with threads on an inner circumferential surface of the valve body at the outer end.

8. The coupler according to claim 6, wherein the valve of the male coupler includes a poppet stem, a sleeve surrounding the poppet stem, and a resilient member biasing the sleeve in a first position preventing fluid from flowing through the cavity.

9. The coupler according to claim 8, wherein a head portion of the poppet stem is seated against the sleeve in the first position to prevent fluid flow through the cavity, and the sleeve is movable away from the head portion to a second position to allow fluid flow through the cavity.

10. The coupler according to claim 8, wherein an end face of the sleeve serves as a seat for an inner end of the resilient member.

11. The coupler according to claim 8, wherein the male coupler further includes a guide spider surrounding the poppet stem, wherein the guide spider serves as a seat for an outer end of the resilient member.

12. The coupler according to claim 11, wherein the guide spider includes a hub and a plurality of circumferentially spaced legs extending radially outwardly from the hub, wherein fluid flowing through the cavity flows around the legs.

13. The coupler according to claim 12, wherein an end face of the adapter abuts the plurality of legs to retain the valve assembly within the valve body of the male coupler.

14. The coupler according to claim 1, wherein when the release sleeve is in the second position, the male coupler is inserted into the axially extending cavity in the valve body of the female coupler, thereby urging the plurality of detents radially outwardly until the detent recess is aligned with the detents.

15. The coupler according to claim 1, wherein when the detent recess is aligned with the detents, the release sleeve is moved to the first position to urge the detents radially inwardly into the detent recess to couple the female and male couplers.

16. The coupler according to claim 1, wherein when the detents are urged into the detent recess, the valves are closed.

17. The coupler according to claim 1, wherein the female and male couplers include respective poppet stems and valve seats, and wherein the coupler is configured such that as the threads on the outer surface of the valve body of the male coupler are being mated with the threads on the inner circumferential surface of the release sleeve, end faces of the poppet stems come into contact with one another.

18. The coupler according to claim 17, wherein as the threads are mated, the sleeve of the male coupler comes into contact with a radially inwardly projecting portion of the valve body of the female coupler and the sleeve is moved to the second position.

19. The coupler according to claim 18, wherein as the threads are mated, the poppet stem of the male coupler is advanced into the cavity of the female coupler, thereby unseating the poppet stem of the female coupler from its valve seat.

20. A female coupler coupleable to a male coupler, the female coupler including:
a valve body having axially inner and axially outer ends, an axially extending cavity for receiving a male coupler at the inner end, and a plurality of circumferentially spaced openings extending through a wall of the valve body proximate the inner end;
a release sleeve surrounding the valve body at the circumferentially spaced openings and being movable between first and second positions relative to the valve body, the release sleeve having threads for mating with threads on the male coupler;
a plurality of detents respectively received in the plurality of circumferentially spaced openings, each detent being urged radially inwardly by the release sleeve when the release sleeve is in the first position and being movable radially outwardly when the release sleeve is in the second position; and
a valve disposed in the axially extending cavity, the valve being openable and closable to allow/prevent fluid flow through the cavity.

21. The coupler according to claim 20, wherein the release sleeve has axially inner and axially outer ends, and wherein the axially inner end has the threads on an inner circumferential surface.

22. The coupler according to claim 20, wherein the release sleeve has a radially inwardly projecting ledge that urges the detents radially inwardly in the first position.

23. The coupler according to claim 20, wherein the female coupler further includes a resilient member that biases the release sleeve in the first position.

24. The coupler according to claim 20, wherein the axially outer end of the release sleeve is retained on the valve body of the female coupler by a retainer.

25. The coupler according to claim 20, wherein the retainer is a polytetrafluoroethylene retaining ring.

26. The coupler according to claim 20, wherein the axially extending cavity in the valve body of the female coupler defines a first cavity portion for receiving the male coupler at the axially inner end of the valve body and a second cavity portion for receiving an adapter at the axially outer end of the valve body.

27. The coupler according to claim 20, wherein the female coupler further includes an adapter received in the axially extending cavity at the axially outer end of the valve body, the adapter configured to be coupled to a tube.

28. The coupler according to claim 27, wherein the adapter includes threads on an outer surface that mate with threads on an inner circumferential surface of the valve body at the outer end.

29. The coupler according to claim 20, wherein the valve body of the female coupler includes a radially inwardly projecting valve seat, and wherein a poppet stem is seated against the valve seat in the first position to prevent fluid flow through the cavity, and movable away from the valve seat to a second position to allow fluid flow through the cavity.

30. The coupler according to claim 20, wherein the valve of the female coupler includes a poppet stem and a resilient member biasing the poppet stem in a first position preventing fluid from flowing through the cavity.

31. The coupler according to claim 30, wherein the poppet stem has a radially outwardly extending portion that serves as a seat for an inner end of the resilient member.

32. The coupler according to claim 30, wherein the valve of the female coupler further includes a guide spider surrounding the poppet stem, wherein the guide spider serves as a seat for an outer end of the resilient member.

33. The coupler according to claim 32, wherein the guide spider includes a hub and a plurality of circumferentially spaced legs extending radially outwardly from the hub, wherein fluid flowing through the cavity flows around the legs.

34. The coupler according to claim 33, wherein an end face of the adapter abuts the plurality of legs to retain the valve within the valve body of the female coupler.

* * * * *